United States Patent [19]

Breil et al.

[11] Patent Number: 5,781,974
[45] Date of Patent: Jul. 21, 1998

[54] MAGNETIC TENTER LEVER ACTUATING DEVICE

[75] Inventors: Jürgen Breil, Grabenstätt, Germany; Paul Lindner, Henndorf, Austria; Bernd Sieber, Dresden, Germany

[73] Assignee: Bruckner Maschinenbau GmbH, Siegsdorf, Germany

[21] Appl. No.: 765,694

[22] PCT Filed: May 22, 1996

[86] PCT No.: PCT/EP96/02190

§ 371 Date: Jan. 14, 1997

§ 102(e) Date: Jan. 14, 1997

[87] PCT Pub. No.: WO96/37358

PCT Pub. Date: Nov. 28, 1996

[30] Foreign Application Priority Data

May 24, 1995 [DE] Germany .............. 195 19 095.5

[51] Int. Cl.⁶ .................................................. D06C 3/04
[52] U.S. Cl. .................................................. 26/94; 26/93
[58] Field of Search ................... 26/93, 94, 89, 26/70, 72, 73, 74, 79; 264/288.4, 290.2, 288.8

[56] References Cited

U.S. PATENT DOCUMENTS

| | | | |
|---|---|---|---|
| 1,119,824 | 12/1914 | Hayward | 26/93 |
| 2,350,961 | 6/1944 | Haskins | 26/94 |
| 2,945,280 | 7/1960 | Liebert | 26/95 |
| 3,054,159 | 9/1962 | Mohring | 26/95 |
| 3,180,002 | 4/1965 | Nash | 26/93 |
| 4,193,175 | 3/1980 | Richter | 26/94 |
| 4,473,929 | 10/1984 | Green | 26/80 |
| 5,072,493 | 12/1991 | Hommes et al. | 26/72 |

FOREIGN PATENT DOCUMENTS

| | | |
|---|---|---|
| 410494 | 1/1991 | European Pat. Off. |
| 1114460 | 10/1961 | Germany . |
| 2159186 | 11/1985 | United Kingdom . |
| 2194563 | 3/1988 | United Kingdom . |

*Primary Examiner*—Amy B. Vanatta
*Attorney, Agent, or Firm*—Nixon & Vanderhye

[57] ABSTRACT

A magnetic tenter lever actuating device includes a coupling rail, preferably designed in the form of a pole shoe rail (21), by means of which the end of a tenter lever (3) can be pivoted deliberately from its open into its closed position and vice versa by means of a coupling region (29) formed at the end. An improved magnetic tenter lever actuating device is primarily characterized by the following features:

the magnetic actuating device for the tenter lever further includes a safety device for actuating the tenter lever, the safety device comprises a mechanically acting redundant system for the forcible opening and/or closing of the tenter lever in the event of the failure or ineffectiveness of the magnetic actuating device, the safety device is arranged and designed such that, when an opening and/or closing movement is to be carried out by means of the safety device, the tenter lever can be pivoted mechanically, at least in its first opening pivoting range, out of its closed position or, at least in its final pivoting range, into its closed position.

20 Claims, 8 Drawing Sheets

MAGNETIC TENTER LEVER ACTUATING DEVICE

The invention relates to a magnetic tenter lever actuating device.

Tenter lever actuating devices, that is to say so-called tenter openers/closers, are used in transport devices for moving material webs, in particular in stretching systems for plastic film webs.

In the production of plastic film, transverse stretching systems, longitudinal stretching systems and also simultaneous stretching systems are known, the material web being gripped at the opposite outer edges and held clamped in movable tenters. Normally, tenters or tenter carriages on which there are seated pivotable tenter levers hold the edge of the material web clamped in relation to a tenter table.

In the region of the clamping point, the tenter levers must be closed and must be opened once more at the end of the transport device, in particular of the stretching system.

For this purpose, mechanical opening and closing systems, in which the tenter lever strikes against a rail and is in each case turned over in the opening or closing direction, are known. Such systems are subject to high wear. The primary disadvantage is also the abrupt beginning of the opening or closing movement and the undamped end of the tilting movement of the tenter levers, also designated as knife flaps below, which strike fully against the respectively provided stops.

Magnetic tenter lever actuating are known.

DE-B 1 114 460 discloses a machine for treating fabric webs, of which the control elements for pivoting the tenter levers or tenter holders include magnetic rails at the relevant sections of the circulation track. The holder levers or tenter levers are in this case configured such that, during their circulation, they pass, at least with an attachment provided on them, as magnet armatures into the region of the magnetic field of the magnetic rails, with the result that the pivoting movement is forcibly carried out under their action.

According to this prior publication, provision is made for the magnetic rail for pivoting the tenter levers to run linearly and parallel to the circulation path of the tenters. In addition, a further pivoting device, which can be actuated by means of a magnetic coupling, is provided, specifically for pivoting the tenter table cooperating with the respective tenter levers. The further magnetic rail is aligned helically with its helix axis parallel to the circulation path, with the result that in the relevant region the tenter table, which is held via a pivoting lever, is pivoted between two end positions as a function of the forward movement of the tenter carriages (that is, of the chain circulation track).

A magnetic coupling device has also been disclosed by the British GB 99 12 45 A1. However, according to this prior publication, provision is made for the tenter levers, which grip the film web and hold it in relation to the tenter table, to be pivoted into the open position by means of a curved track representing a stop. Only in its final open position is the tenter lever held by a magnet. For the purpose of closing, a lever holding the magnet is pivoted into an open position by running onto a wheel, the magnetic coupling being forcibly cancelled thereby and the tenter lever falling down onto the tenter table because of its dead weight. The particular disadvantage here is the opening and closing process, which actually proceeds mechanically, as a result of which the severe mechanical stresses outlined at the beginning lead to the disadvantages listed there.

A horizontal stretching machine for clamping or tensioning the edges of a plastic film web by means of a magnetically actuable tenter lever device has also been disclosed by EP 0 410 494 B1. In order to open and close the clamping levers (tenter levers), permanent magnets are provided here on the tenter lever, opposite the clamping point. For the purpose of closing or opening the tenter levers in accordance with the opening or closing curve of the tenter levers, stationary magnets are arranged in the inlet and in the outlet region of the stretching machine along a corresponding rail, the stationary magnets on the appropriate line section, as well as the magnets provided on the tenter levers, being poled to repel. As a result of this repulsion force, the knife or tenter flap is pivoted from its open into its closed position or, vice versa, from its closed into its release position.

This last-named arrangement has in particular the disadvantage that each individual tenter lever must be equipped with a separate magnet, which not only means a high production cost in relation to the individual knife or tenter flaps but, above all, also contributes to making the overall system considerably more expensive.

The object of the present invention is therefore, proceeding from the generic prior art, to provide an improved, magnetically actuable tenter lever actuating device.

By means of the magnetic tenter lever actuating device according to the invention, reliable and efficient closing and opening movements of the tenter levers or knives may be carried out. Since the opening and closing movement is carried out only via the magnetic coupling, the mechanical stress is reduced drastically, for example, in relation to mechanical closing and opening devices. Above all, the sound loading is also considerably reduced.

As a result of the safety device in the form of a mechanical rail provided according to the invention, it is possible to achieve the important advantage that, even in extreme situations (in which, for example, a tenter lever does not open because of extremely high clamping forces), damage to the overall system and/or impairment of the film being produced therewith is/are reliably avoided. This is because, in the event that the magnetic coupling forces should not be sufficient, further continuous operation of the system without any interruption is nevertheless possible as a result of the safety device according to the invention. At least by means of the redundant mechanical rail, the tenter lever can be turned over appropriately (this generally has primary significance during the opening of the tenter lever, that is, during pivoting over from its closed into its open position, a corresponding mechanical forcible changeover from the open into the closed position also fundamentally being possible in the case of a further rail lying opposite).

In this case, in an advantageous refinement of the invention, the mechanical rail serving for safety may exhibit resilient behavior at least in subregions, that is to say it can itself be resiliently formed and/or resiliently supported.

In contrast to DE-B 1 114 460, surprising that, by means of a specific pole shoe shaping and/or by means of a specific configuration of the magnetic return path or armature formed on the tenter lever, provides magnetic coupling forces which can be considerably increased in comparison with previous solutions. This offers the further advantage that high magnetic coupling forces can be produced even when magnets which are comparatively "weak" with respect to the prior art are used.

Specifically, according to the invention, the improvement is achieved, inter alia, in that the pole shoes are designed in cross-section with increasing material thickness in the direction of the tenter lever, that is, in the direction of the coupling attachment, forming the magnetic return path, of the tenter lever. It has specifically been shown that, as a result, the stray flux may be considerably increased to the benefit of the useful flux, as a result of which the force effect increases.

In an alternative or supplementary embodiment, provision is made for the magnets, preferably comprising permanent magnets, to be arranged between the two pole shoes such that the magnets opposite the tenter lever project beyond the pole shoes, to be precise preferably by more than 5%, in particular 10% or about 15%, of the height of the pole shoe rails which accommodate the magnets between them in the manner of a sandwich.

As an alternative and/or supplement thereto, a further increased force effect and associated magnetic coupling are achieved by the coupling region which is formed on the tenter lever and forms the magnetic return path or the armature has, in cross-section, a U-shape or at least approximately a U-shape. The two U-shaped limbs in this case are located in alignment with the two pole shoe rails which are arranged with a transverse offset. By comparison with a return path having a flat or virtually flat surface in the air gap zone, a considerable increase in the force and a very much steeper force characteristic curve in relation to the deflection is achieved by this means.

In a particularly preferred embodiment of the invention, all the previously explained measures which already individually considerably improve the force effect are applied cumulatively.

In a development of the invention, the limb height of the coupling sections of U-shaped cross-section on the tenter lever corresponds to about 2 to 10 times, in particular 3 to 8 times, above all 4 to 6 times, the height of the air gap zone between U-shaped coupling region and pole shoes. The base region connecting the two limbs of the U-shaped coupling region preferably has a thickness which corresponds to about 0.5 to 2 times, preferably 0.75 to 1.5 times, in particular 1.0 to 1.2 times, the limb height.

A further improvement may be achieved if the width of the U-shaped limbs of the coupling region are at least slightly narrower than the maximum width of the pole shoes adjacent to the coupling region of the tenter lever. In this case the width of the limbs, in relation to the width of the pole shoes, can preferably be about 0.6 to 0.9 times, in particular 0.8 to 0.9 times, the width of the pole shoes.

In this case it is emphasized that, in spite of the use of a non-contacting magnetic coupling, high safety can be ensured simply by providing an emergency running rail parallel to the pole shoe rail. If, for any reasons, the tenter lever should not be turned over simply by the magnetic effect during opening or closing, then the tenter lever would preferably strike with its end against the emergency running rail and, as a function thereof, be turned over into the respectively desired turned-over position. This could be of importance in practice primarily only when the closing forces for fixing the moving material web become too great for the magnetic coupling forces. However, after briefly striking against the emergency running rail and overcoming the clamping forces, the magnetic coupling would as a rule act once more in order to pivot over the tenter lever in a deliberate and controlled manner following the course of the magnetic rail.

Finally, in an alternative or preferred embodiment of the invention, provision is moreover made for the pole shoe rail to be able to escape, in particular to pivot, in the event of a disturbance.

The invention is explained in more detail below by reference to exemplary embodiments. In this case, in detail:

Figure 1A:
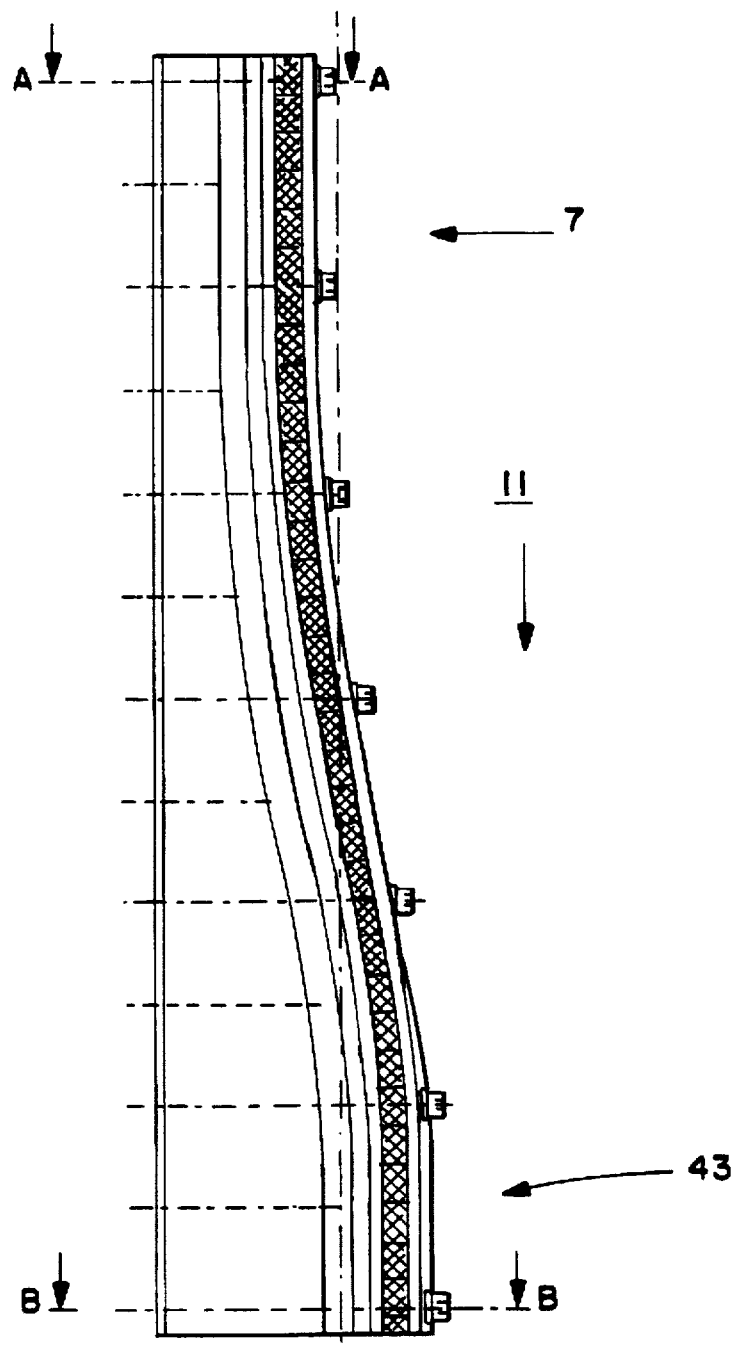
FIG. 1a is a fragmentary schematic plan view of a transport device running on one side of a moving material web and having a magnetic pole rail device for pivoting a tenter lever.

Illustrated in FIG. 1a, is a detail of a guide device running on one side of a moving transport web (for example of a plastic film web in a film stretching system), along which guide device tenter bodies 1 can be moved. In the case of a transverse stretching system, this guide device may be a tenter chain, in the case of a simultaneous stretching system this device may also be, for example, tenter carriages whose distance from one another becomes larger in the stretching zone than in the inlet zone (stack region). A tenter carriage 1 is partly indicated in cross-section only in portions and schematically in FIG. 4 and 5, and is shown there essentially only with reference to the tenter lever and a tenter table.

In the top view according to FIG. 1a, for example, a detail of the guide device for the tenter bodies 1 which can be moved along this guide device is shown, the guide device including an actuating device for the magnetic opening and closing of the tenter levers 3, also designated as tenter knives.

Figure 2:
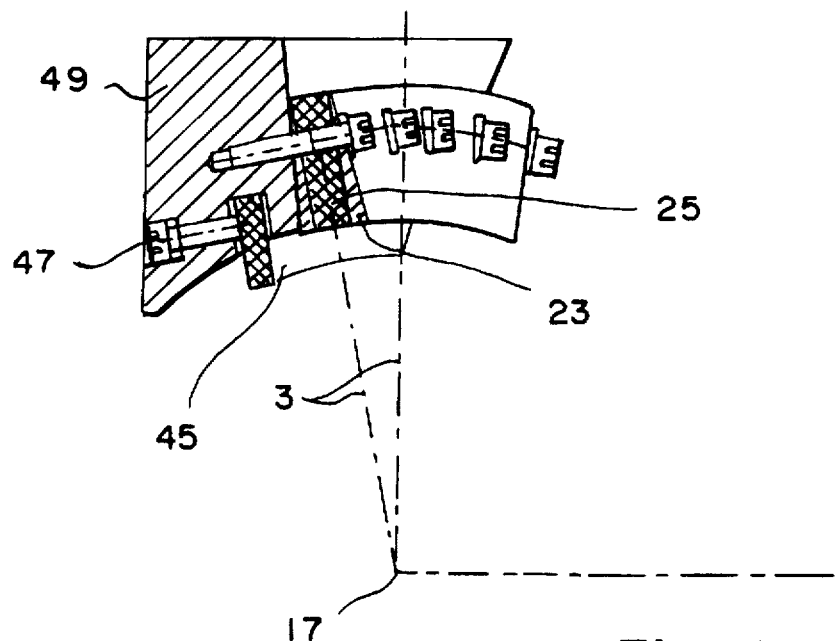
FIG. 2 is a schematic cross-sectional view taken along the line A—A in FIG. 1.

In the so-called catching region 7, the tenter levers 3 then still assume their closed position, in which one edge of a moving material web 11 (for example of a film web to be stretched) is held clamped between the clamping region 3' of the tenter lever 3 and the so-called clamping table 13. In this case, the tenter lever 3 assumes the position which is reproduced with a dashed line in the schematic cross-sectional representation according to FIG. 4. This position is indicated schematically in FIG. 2, the longitudinal axis of the lever being pivotable in FIG. 2 about an axis 17 running parallel to the guide track or transport direction.

Figure 1B:
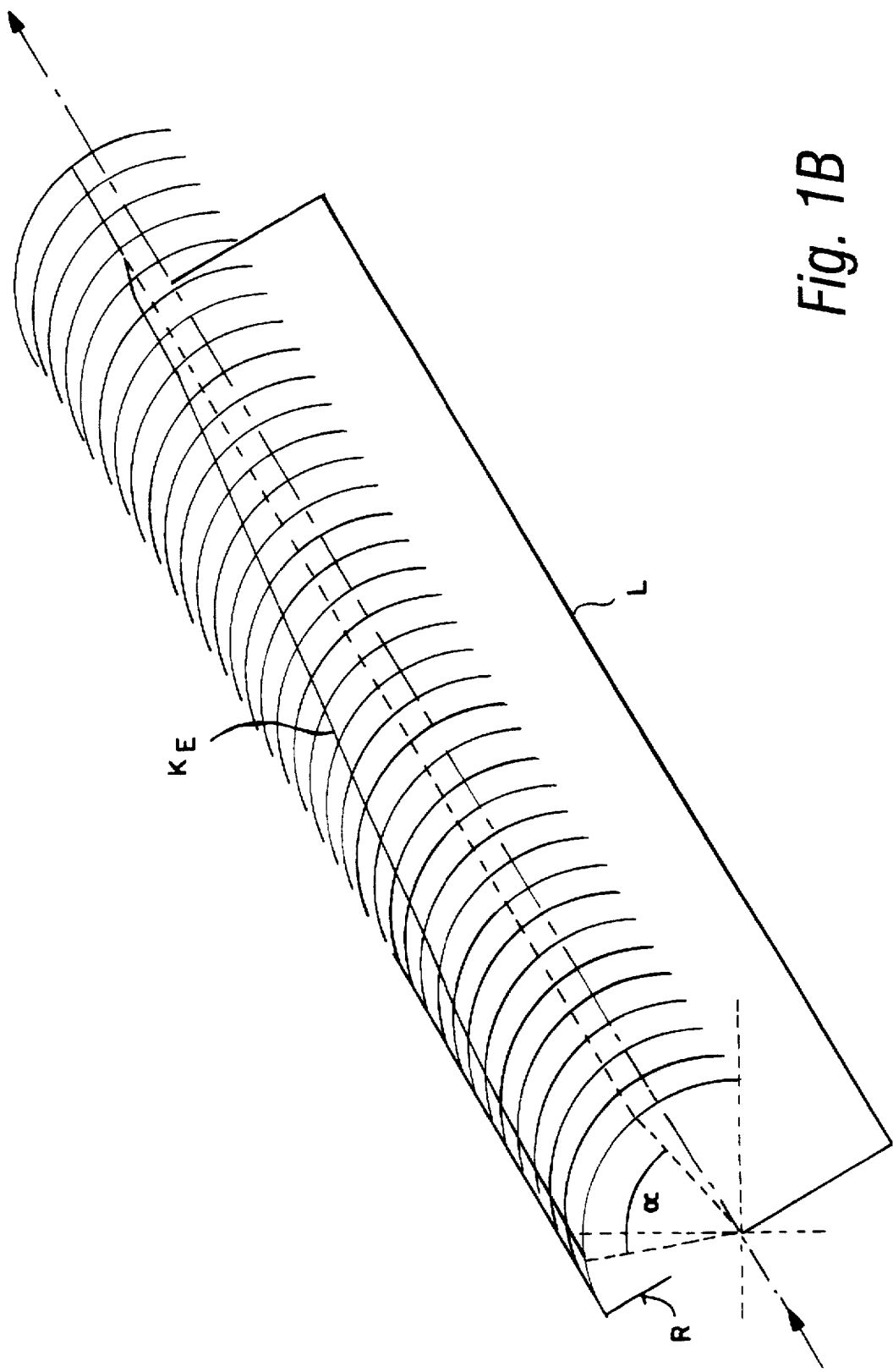
FIG. 1b is a schematic illustration of the pivoting movement of the rear end of a tenter lever during the forward movement of a tenter carriage.

With reference to FIG. 1b, in this case the movement path $K_E$ is depicted in a perspective representation, said path running through the end of the tenter lever 3 during its pivoting movement in the closing direction when it is being pivoted in accordance with the arrow, along a rectilinearly running guide rail, indicated by a dash-dotted line, during the further travel of the tenter carriage. The end of the tenter lever therefore subsequently describes a slightly spiral or helical pivoting movement about an angle α about its pivot axis 17. L in FIG. 1b denotes the path length over which the pivoting movement of the tenter lever is executed. In this case, R denotes the length of the tenter lever in relation to its pivot axis 17.

Figure 4:
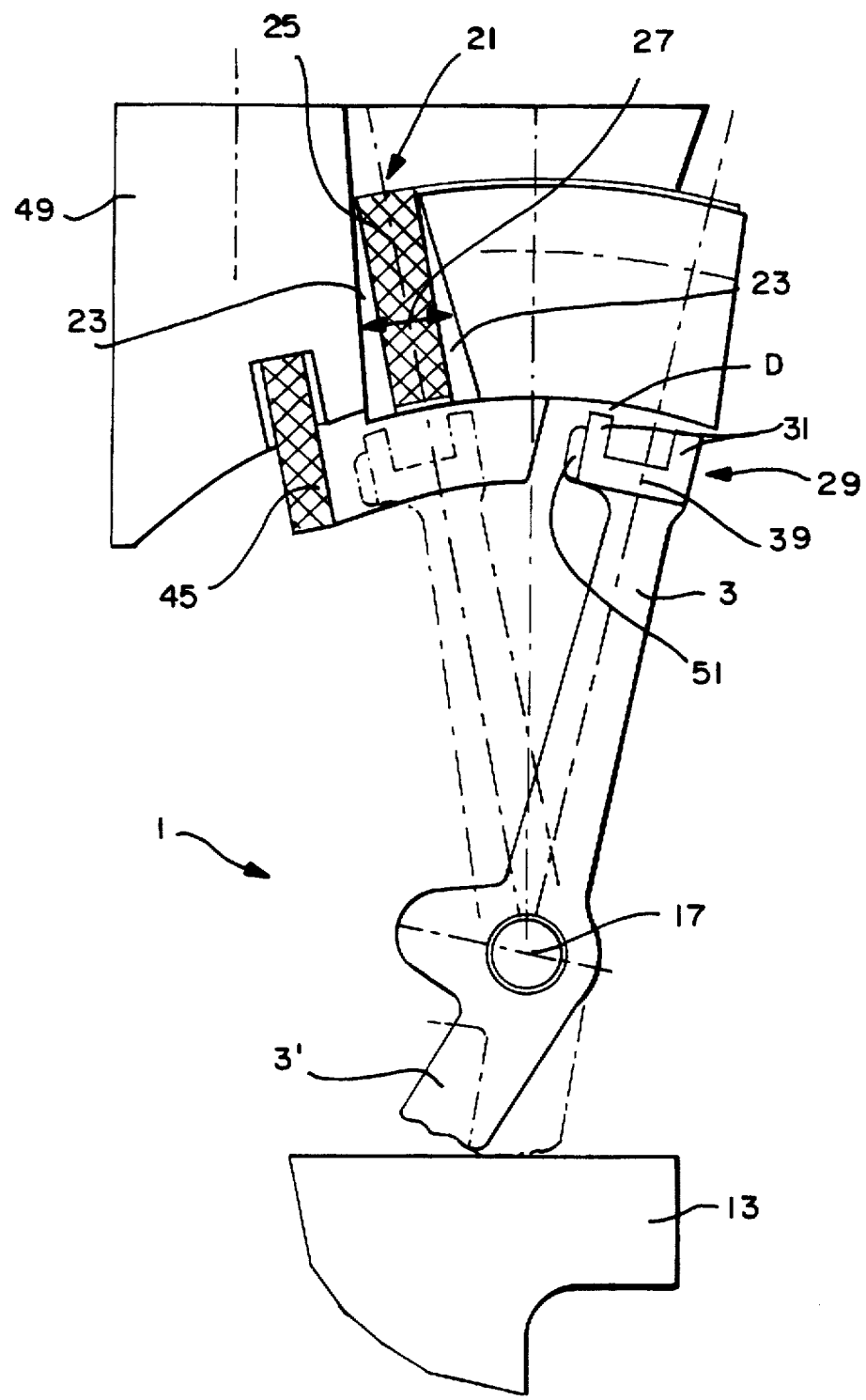
FIG. 4 is a schematic enlarged cross-sectional representation through a tenter body, shown only in outline, with a tenter lever which can pivot thereon and a magnetic pole rail.

As can be seen from the enlarged schematic cross-sectional representation according to FIG. 4, a pole shoe rail 21 is arranged, in axial extension of the tenter lever 3, in the longitudinal direction of the guide track/transport device, but running above the latter in a sinusoidal or slightly helical manner.

The pole shoe rail 21 in this case comprises two pole shoe rail sections 23, running with a lateral offset to each other, between which magnets 25 are arranged in the manner of a sandwich, with the pole and magnetic flux direction 27 aligned transversely thereto. Use is preferably made of permanent magnets, but electro-magnetically excitable magnets are also possible. In this case, a multiplicity of separate magnets 25, situated one behind another, can be provided along the advance rail 21.

From the enlarged schematic cross-sectional representation of FIG. 4 it can be seen that the pole shoe rail sections 23 broaden conically in cross-section in the direction of the tenter lever 3. In the overall exemplary embodiment, this cross-section is of trapezoidal or triangular design.

Moreover, the magnets 25 provided between the two pole shoe rail sections 23 are arranged such that they are located offset in the direction of that region of the pole shoe rail sections which tapers in cross-section (that is to say away from the tenter lever) and, in this arrangement, preferably project beyond the height H of the pole shoe rail sections by an amount of at least 5%, preferably more than 10%, in particular by 15%.

The coupling section 29 of the tenter lever 3, which forms the magnetic return path or armature, runs underneath the so-called pole shoe rail 21, whilst forming a narrow air gap D.

In the exemplary embodiment shown, the cross-sectional shape of this coupling section 29 is essentially formed in a U-shape.

Figure 5:
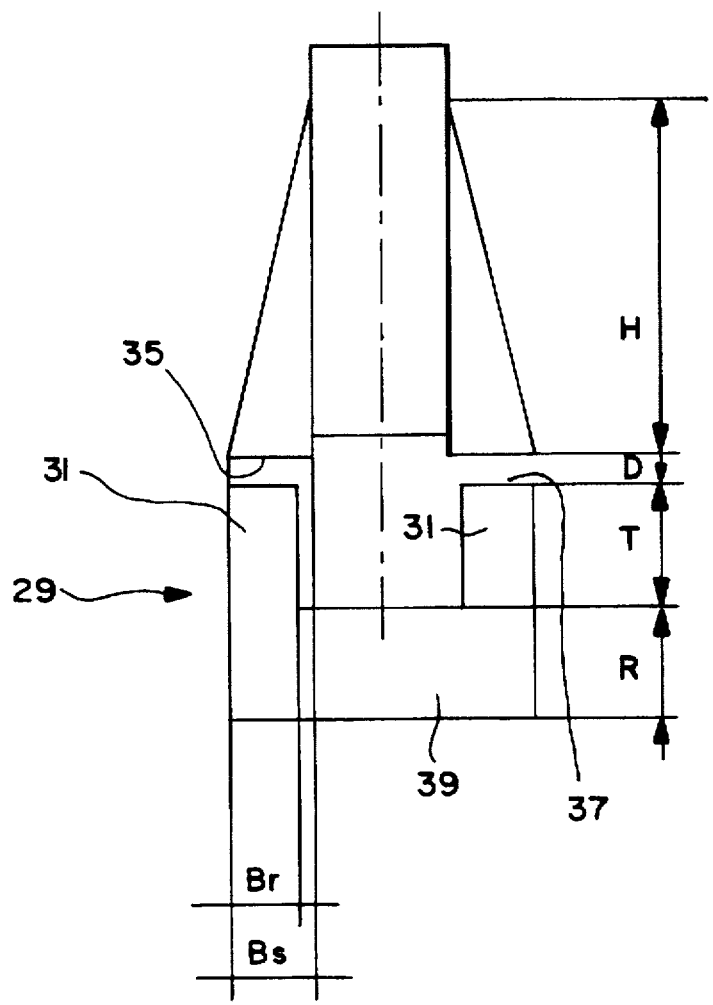
FIG. 5 is an enlarged schematic representation of a detail of the magnetic pole rail in cross-section and of the magnetic return path on the tenter lever.

It can be seen from the enlarged representation of a detail according to FIG. 5 that the height T of the limbs i.e., flanges 31 of the coupling section of U-shaped cross-section is intended to form about 2 to 10 times, preferably 3 to 8 times, in particular 4 to 6 times, the air gap D between the active surfaces 35 of the pole shoe rail 21 and the active surface 37 of the end sides of the limbs 31 of the U-shaped coupling section 29.

The thickness R of the base 39 of the coupling section 29, which is U-shaped in cross-section transverse to the transport direction 15, is selected such that this thickness R corresponds to about 0.5 to 2 times, in particular 1.0 to 1.2 times, the limb height T.

A further improvement may be achieved by the limb thickness Bs of the limbs 31 of the U-shaped coupling section 29 being slightly narrower than the maximum thickness of the pole shoe rail sections 23, which thicken in cross-section in the direction of the tenter lever. It has proven to be favorable here if this limb thickness Bs corresponds to less than 0.9 times the large pole shoe rail thickness Br. It is more favorable if the limb thickness Bs in this arrangement corresponds to more than 0.5 times, in particular more than 0.6, 0.7 or 0.8 times, the maximum pole shoe rail thickness Br.

The mode of action of the magnetically actuable tenter opener/closer is explained below.

After the tenter lever 1, which is in the dashed position in FIG. 4 and is holding the edge of a material web tensioned with respect to the tenter table, has passed into the catching region 7, the pole shoe rail 1 runs slightly sinusoidally in top view, that is to say in a partially helical path.

Figure 3:
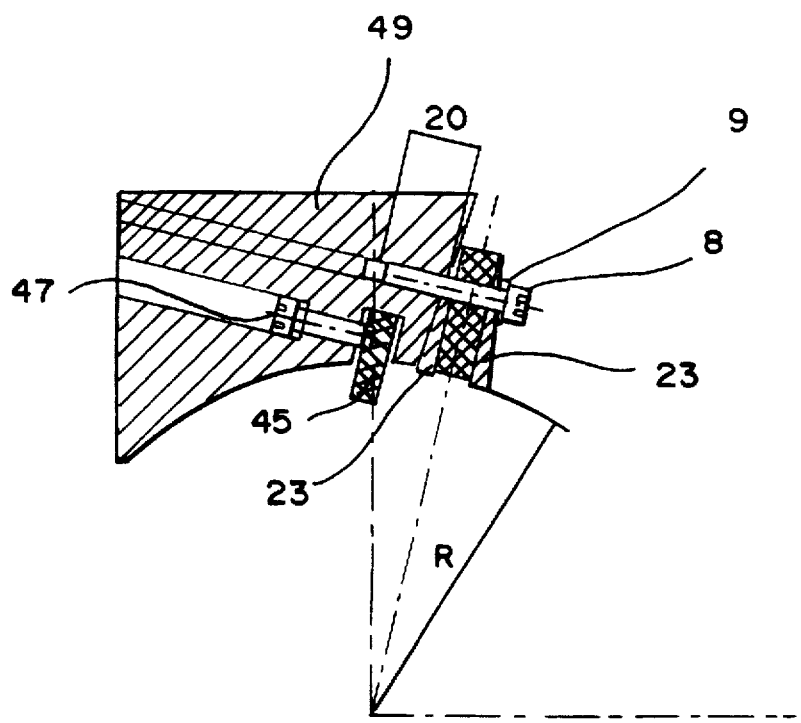
FIG. 3 is a cross-sectional view taken along the line B—B in FIG. 1.

The magnetic force lines proceeding from the magnet 5 pass over the pole shoe rail sections 23 and the coupling section 29 of U-shaped cross-section. As a result of the magnetic coupling forces effected thereby, the tenter lever 3 is pivoted about its axis 17 from its closed position as far as into its maximum open position represented in FIGS. 3 and 4, in accordance with the course of the pole shoe rails 21. By virtue of the tangential catching region and the tangential release region 43, a continuous and overswing-free pivoting movement results.

Figure 6:
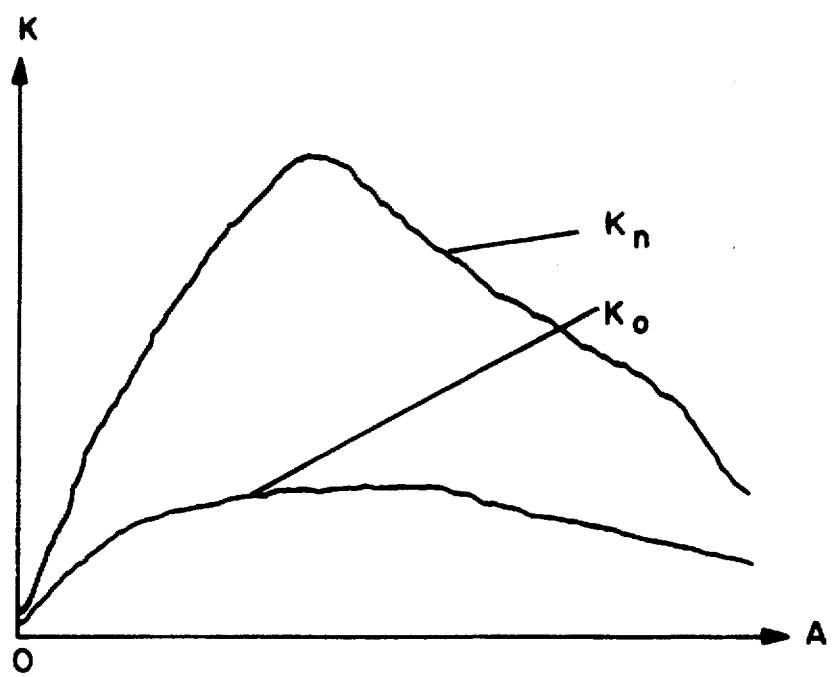
FIG. 6 is a diagram to illustrate the characteristic force curve in relation to the deflection (pivoting) of the tenter lever.

In the diagram of FIG. 6, the force variation K in relation to the deflection A of the tenter lever is represented in relative form. The curve $K_n$ shows the force variation if the armature-like return path (coupling section 29) on the tenter lever is U-shaped and the pole shoe rail sections 23 are shaped with material thickness increasing towards the tenter lever. In comparison with this, the force line characteristic map $K_0$ is also depicted in FIG. 6, and corresponds to a force variation if use is made of a flat, that is to say not U-shaped in cross-section, return path or coupling section 29 and rail sections 23 which have a uniform material cross-section.

During the gripping and clamping of a film web, the closing movement is carried out by changeover in the opposite direction, using an appropriate pole shoe rail.

Moreover, a safety or emergency running rail, which comprises a mechanical stop rail 45, is further shown in the drawings. This stop rail is anchored along the pivoting region, so that it is adjustable on a pole shoe rail carrier 49, by means of screws 47 in such a way that in the exemplary embodiment shown it projects beyond the lower limit of the active surface 35 of the pole shoe rail 21 and, in so doing, is arranged so that it follows the course of the pole shoe rail 21 at the side. A sliding body 51 is provided, at the same height, on the side of the coupling section 29 of the tenter lever 3. If, for unexpected reasons, in an individual case the magnetic coupling which has been explained should not be sufficient, the tenter lever 3, that is to say the sliding body 51, would strike against the stop rail 45 laterally and, by virtue of the longitudinal course of the stop rail 45, which is sinusoidal or helical in top view, lever 3 would then be pivoted into the open position as a result of the effect of mechanical force. Following mechanical triggering as a result of the sliding body 51 striking against the stop rail 45, the tenter lever, however, would not then swing over abruptly into the open position but would be caught by the magnetic coupling of the pole shoe 21 and pivoted further in a targeted manner into its final open position without any overswing.

In this arrangement, the mechanical rail 45 may have a resilient behavior in subregions, that is to say for example may be resiliently constructed and/or composed or at least resiliently supported.

The pole shoe rail sections 23, and also at least the coupling region 29 on the tenter lever 3, consist of magnetically highly conductive material, in particular of ferromagnetic material.

Figure 7:
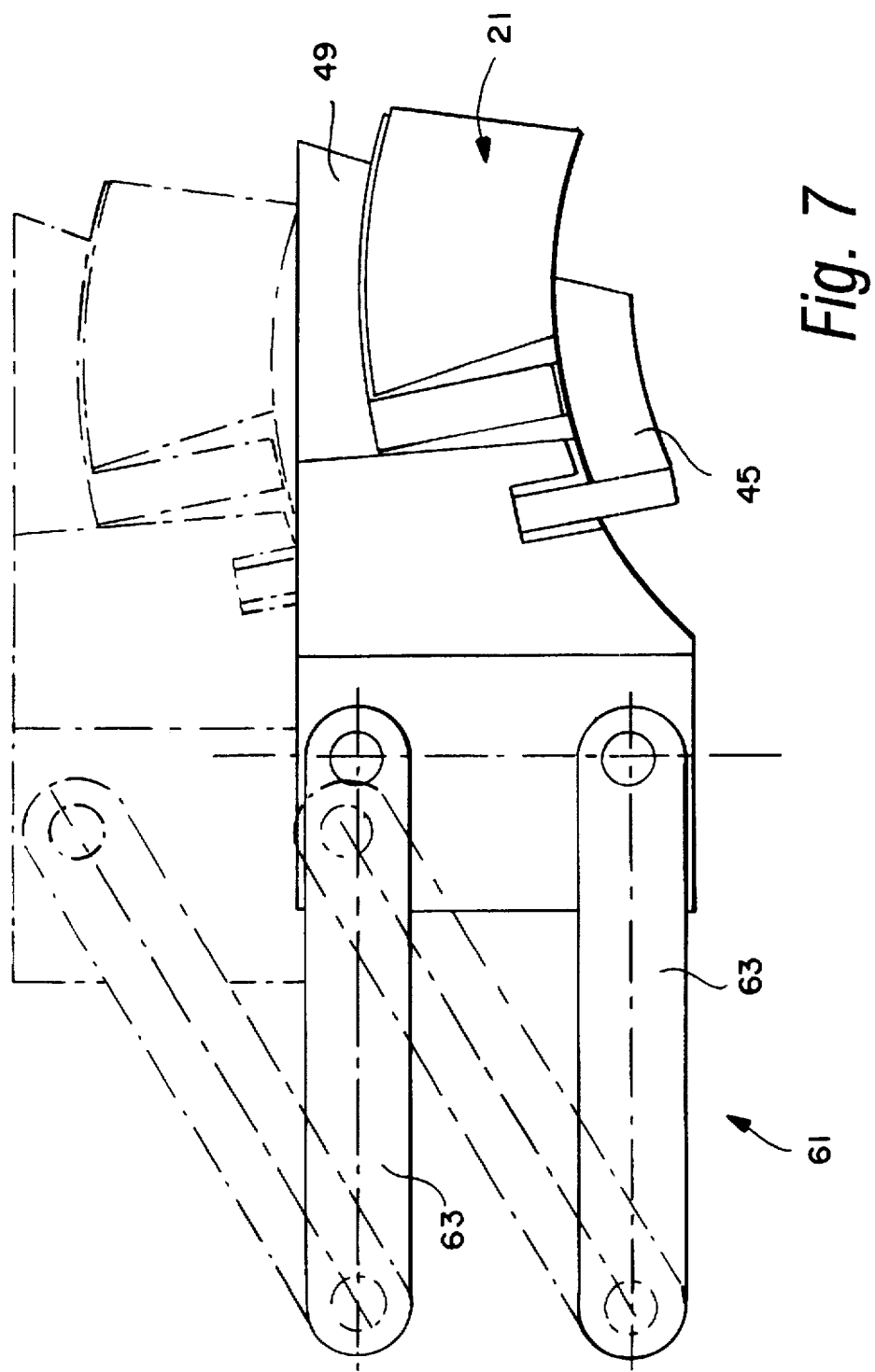
FIG. 7 is a view, essentially corresponding to the FIG. 4, of a portion of a pole shoe rail with an escape device.

The pole shoe rail represented in FIG. 4 is reproduced once more using FIG. 7. Differing from the exemplary embodiment according to FIG. 4, however, the pole shoe rail carrier 49 is now anchored and guided via an escape device 61. In the event of a fault condition, if for example film residues should pass into the air gap between the tenter lever end 29 and the pole shoe rail 21, the entire pole shoe rail can, for example, escape counter to the gravitational force (and/or the magnetic coupling forces between the tenter levers and the pole shoe rail) by means of the mentioned escape device 61; it can escape upward in the exemplary embodiment shown. The escape device 61 in this case comprises a parallel guide using a plurality of pivotable levers 63 which are arranged parallel to one another. A position assumed via the escape device is represented with a dot-dashed line in FIG. 7.

Figure 8:
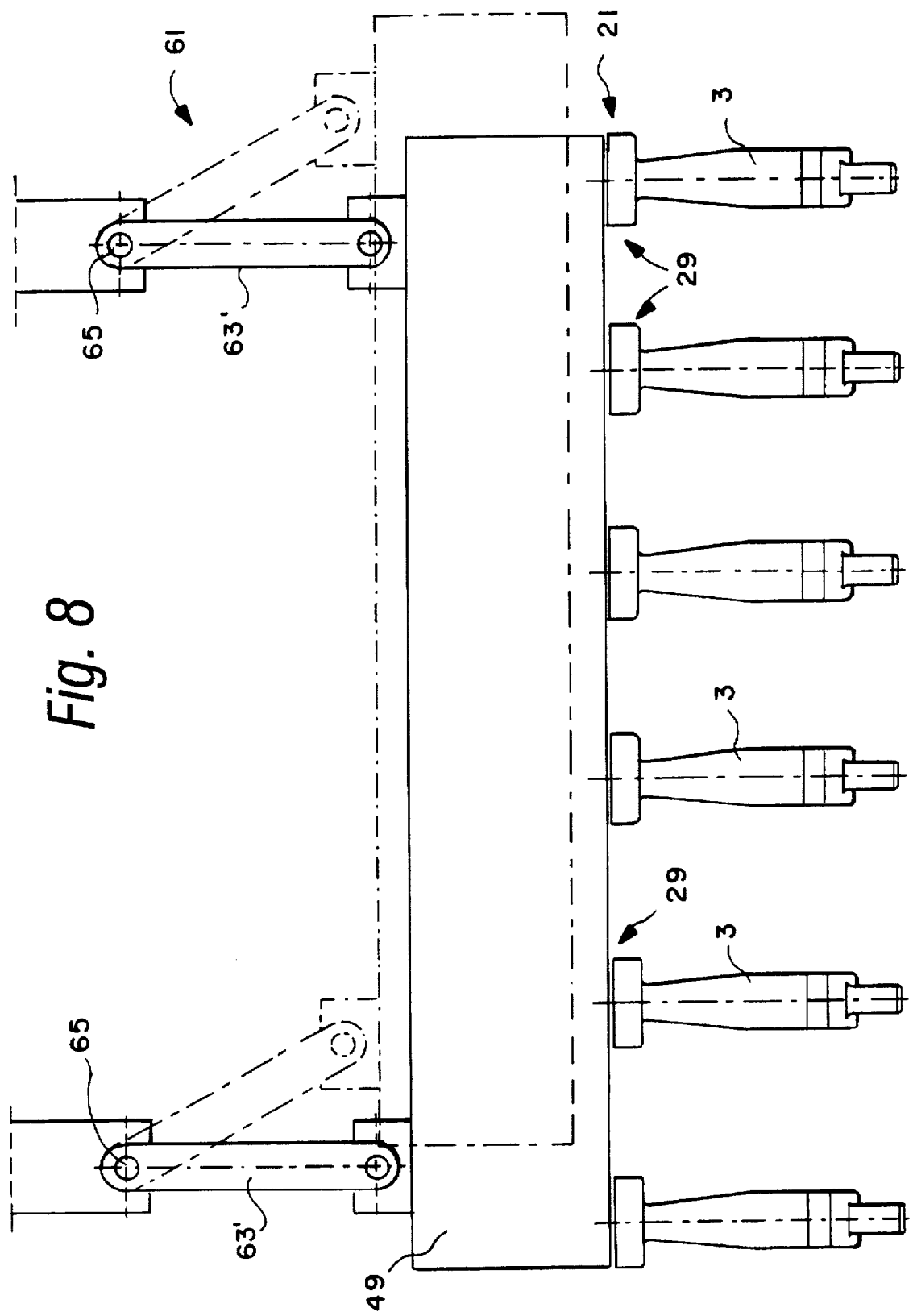
FIG. 8 is a side view transverse to the pole shoe rail with an escape device differing from FIG. 7.

In an embodiment in accordance with FIG. 8, which is an alternative to this, it is provided for the escape device 61 to include levers 63' which essentially hang down in the vertical direction and on which a the bottom the pole shoe rail 21 is hung, for example on the pole shoe rail carrier 49. In the case of FIG. 8, several tenter levers 3 are depicted in side view (that is to say in the plane of the material web), said levers belonging to different tenter carriages which are normally moved along the pole shoe rail 21 offset longitudinally from one another. In the event of a disturbance (that is to say, if, for example, film residues pass into the magnetic gap between pole shoe rail and the magnetic coupling end of the tenter levers 3), the pole shoe rail 21 could then—as is likewise depicted with a dashed line—be pivoted from its lowest position, by means of the levers 63', about its upper suspensions with a transverse component which is lateral but above all is also directed away from the ends of the tenter levers. After the elimination of the disturbance, a pivoting-back into the functional position can be carried out merely by the force of gravity, such as, inter alia, also in the case of the exemplary embodiment according to FIG. 7.

The exemplary embodiments have been described and shown for the case in which the magnets 25 used are permanent magnets. Equally well, however, instead of permanent magnets, use may be made of electromagnets or else a mixture of permanent magnets and electromagnets. If only electromagnets are used or if magnets comprising electromagnets and permanent magnets are used, these electrically drivable magnets can be operated either continuously with power or else with pulse excitation.

We claim:

1. In a transport device for a moving material web having a coupling rail extending at least partially along a circulation path, a magnetic tenter lever actuating device comprising:

a tenter body movable along said path and including a tenter lever mounted for pivotal movement about an axis on said tenter body between open and closed positions relative to the web, said tenter lever having a coupling section;

a magnetic coupling between said coupling rail and said coupling section for pivoting said tenter lever as said tenter body moves along said path defined by said coupling rail;

said coupling section being separated from said coupling rail by an air gap; and an auxiliary safety device for actuating said tenter lever including a mechanical system for mechanically pivoting said lever toward said open position or said closed position in the event of a failure or ineffectiveness of said magnetic coupling.

2. A device according to claim 1 wherein said safety device comprises a mechanical rail extending generally parallel to said coupling rail and offset relative to said coupling rail such that said tenter lever, in the event of failed or insufficient magnetic coupling, strikes said mechanical rail for pivoting said tenter lever toward one of said open or closed positions.

3. A device according to claim 1 wherein said coupling rail comprises a pole shoe rail including two pole shoe rail sections laterally offset relative to one another, magnets disposed between said rail sections, said coupling section on said tenter lever forming a magnetic return path, a thickness of said pole shoe rail sections increasing in the direction of said tenter lever.

4. A device according to claim 3 wherein said pole shoe rail sections have a cross-section increasing conically in the direction of said tenter lever.

5. A device according to claim 3 wherein said pole shoe rail sections have walls generally divergent from one another in a direction toward said tenter lever.

6. A device according to claim 3 wherein said coupling section has a generally U-shaped cross-section generally transverse to said pivot axis of said tenter lever.

7. A device according to claim 6 wherein said U-shaped coupling section has a pair of flanges and a base, the height of said flanges above said base and extending toward said air gap being about 2 to 10 times the thickness of said air gap between said pole shoe rail and said coupling section.

8. A device according to claim 6 wherein said U-shaped coupling section has a pair of flanges and a base, said base having a thickness about 0.5 to 2 times the height of said flanges above said base.

9. A device according to claim 6 wherein said U-shaped coupling section has a pair of flanges and a base, the thickness of said flanges being at least slightly less than the maximum lateral distance of said pole shoe rail sections from one another.

10. A device according to claim 9 wherein the thickness of said flanges is about 0.5 to 0.9 times the maximum lateral distance of said pole shoe rail sections from one another.

11. A device according to claim 3 wherein said magnets are disposed between said two pole shoe rail sections and project beyond an upper edge of said pole shoe rail sections on a side thereof facing away from said tenter lever.

12. A device according to claim 11 wherein said magnets project beyond a height of said pole shoe rail by at least 5%.

13. A device according to claim 1 wherein said mechanical system includes a resilient mechanical rail for pivoting said tenter levers in response to said tenter levers striking said mechanical rail.

14. In a transport device for a moving material web having a coupling rail extending at least partially along a circulation path, a magnetic tenter lever actuating device comprising:

a tenter body movable along said path and including a tenter lever mounted for pivotal movement about an axis on said tenter body, said tenter lever having a coupling section;

a magnetic coupling between the coupling rail and said coupling section formed on said tenter lever for pivoting said tenter lever as said tenter body moves along said path defined by said coupling rail;

said coupling section being separated from said coupling rail by an air gap;

said coupling rail including a pole shoe rail; and an escape device for moving said coupling rail away from the coupling region of the tenter levers.

15. A device according to claim 14 wherein said escape device includes a plurality of levers for pivoting said escape device away from said tenter levers.

16. A device according to claim 14 wherein said pole shoe rail is movable away from said tenter levers counter to the force of gravity.

17. A device according to claim 14 wherein said escape device includes a pair of parallel guides.

18. A device according to claim 14 wherein said magnetic coupling includes permanent magnets.

19. A device according to claim 14 wherein said magnetic coupling comprises electromagnets or electromagnets and permanent magnets.

20. A device according to claim 19 wherein said electromagnets are operable with continuous power or with pulse excitation.

* * * * *